Nov. 16, 1954     A. L. FAURES     2,694,495
ARTICLE CARRIER
Filed April 30, 1952     2 Sheets-Sheet 1
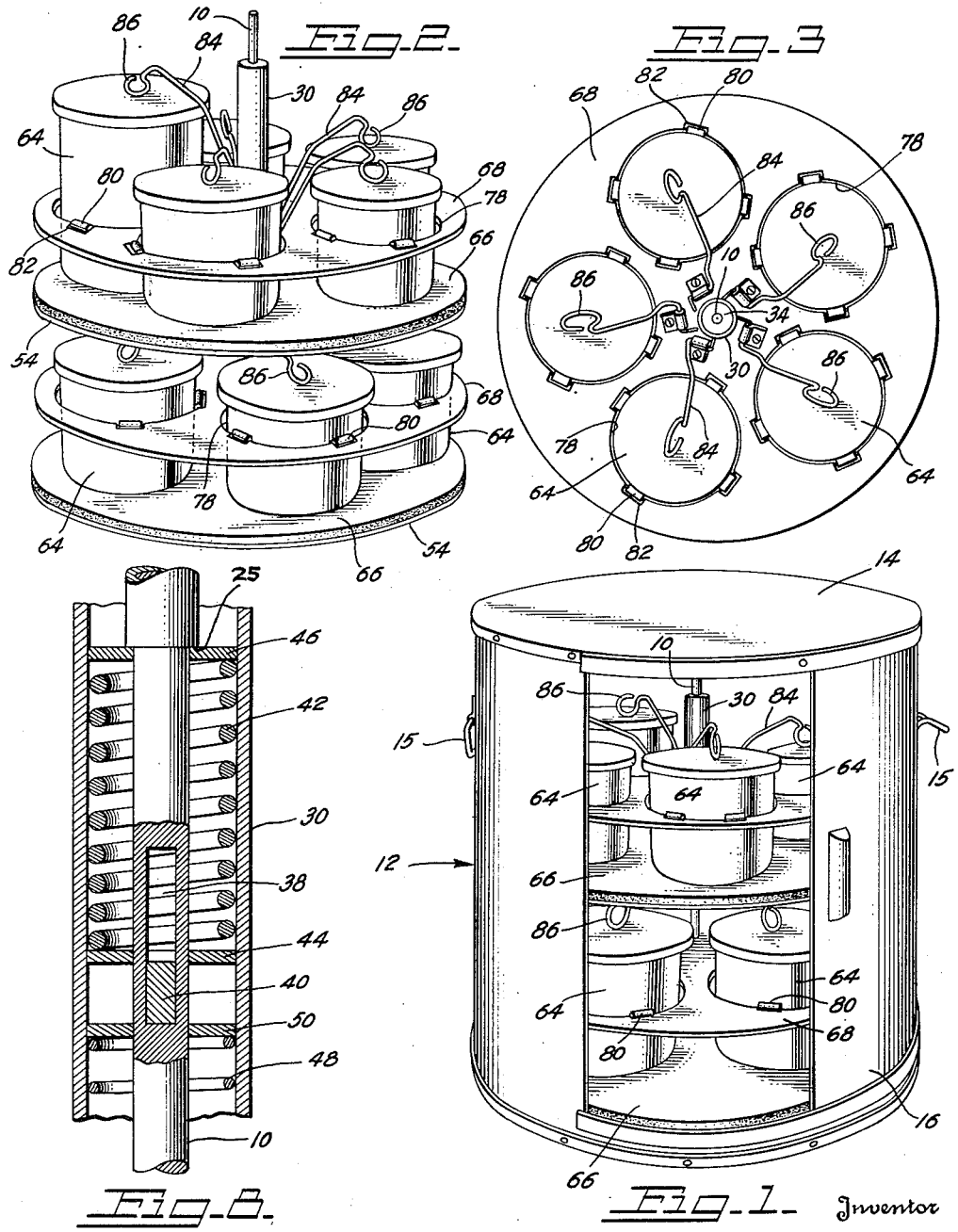

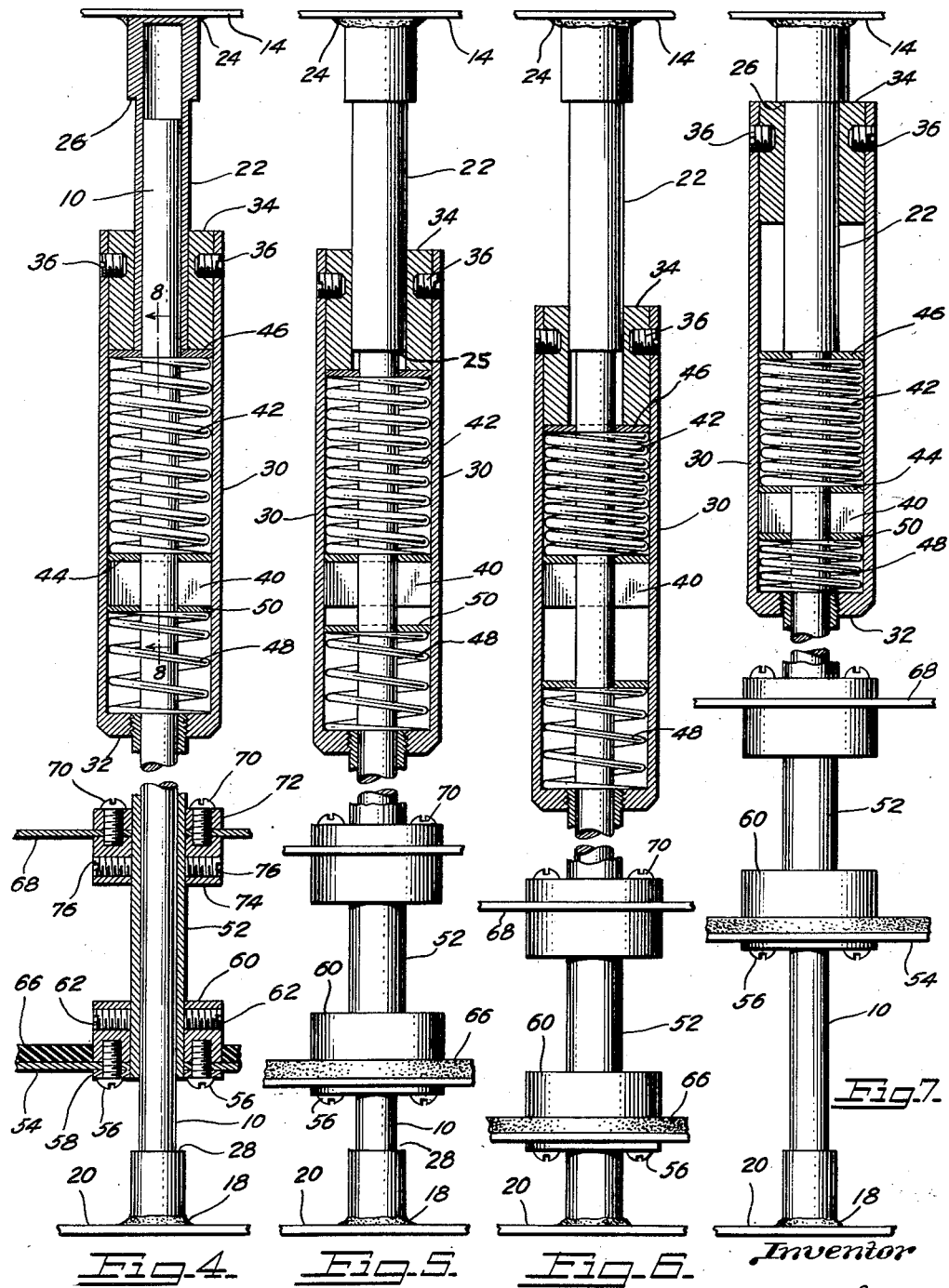

United States Patent Office 2,694,495
Patented Nov. 16, 1954

2,694,495

ARTICLE CARRIER

Arthur L. Faures, Baton Rouge, La.

Application April 30, 1952, Serial No. 285,247

3 Claims. (Cl. 211—74)

This invention relates to a vibration-proof and shock-proof mounting and, more particularly, to a carrier for delicate instruments. The carrier will be described for use with conventional watt-hour meters used by electric utility companies to measure power consumption of their customers, but it will be realized that other types of delicate instruments or articles can be supported or housed in the carrier with complete protection from damage by vibration or shock.

Commercial watt-hour meters which are installed on consumers' premises are periodically replaced, about every eight years or so, with freshly calibrated meters while the removed meter is cleaned, tested, overhauled if necessary, recalibrated, and placed in storage for future reuse. Service men engaged in such meter replacement work usually remove a considerable number of such recalibrated meters from storage and carry them about in a truck until installation.

At present, inadequate facilities are provided in such trucks for protecting, while in transit, watt-hour meters from impairment of their accuracy by vibration and/or road shocks. Since considerable time and expense are expended in testing and recalibrating such meters, subsequent impairment of accuracy by rough transportation is extremely wasteful of both time and money.

Hence, it is an object of this invention to provide a shock and vibration-proof carrier for watt-hour meters.

It is another object of this invention to provide a carrier of the type described that is in the form of a portable case that may be carried in a truck.

It is another object of this invention to provide a carrier of the type described that can be permanently installed in a truck.

It is still another object of this invention to provide a carrier of the type described that will protect delicate instruments or articles against impairment of accuracy, or other damage, by road shocks, jars, and/or vibration.

It is a further object of this invention to provide an improved carrier of the type described that is relatively simple yet extremely effective for its intended purpose.

Other objects and advantages of the invention will be evident from the following description and accompanying drawings, in which:

Figure 1 is a perspective view of a portable carrier case embodying this invention.

Figure 2 is a perspective view of the supporting unit shown in Figure 1, but illustrated with the case removed to illustrate details more clearly.

Figure 3 is a plan view of the unit shown in Figure 2.

Figures 4, 5, 6, and 7 are fragmentary vertical sectional views taken centrally through the case shown in Figure 1, and illustrating successive movements of the movable portion of the unit shown in Figure 2 when subjected to a heavy shock.

Figure 8 is a fragmentary sectional view taken on line 8—8 of Figure 4.

Referring now to the drawings, the basic supporting member of this invention is an upright round post 10 which may be removably installed in a suitable compartment (not shown) in a truck body, or may be mounted in a suitable casing 12, preferably of metal, to comprise a weatherproof, portable carrying case, as shown in Figure 1. In this latter instance, the casing 12 may be of drum-like form having a removable top 14, carrying handles 15, and a slidably mounted side door for access to the interior of the case.

The post 10 is mounted centrally in the casing 12, having its bottom end welded, as at 18 (Figure 4), or otherwise suitably secured to the container bottom 20. The top of the post 10 is snugly received within a tubular member 22, welded as at 24, or otherwise suitably secured to and depending from the underside of the container top 14. The upper end of the member 22 and the lower end of the post 10 are circumferentially enlarged, to provide a downwardly-facing and an upwardly-facing shoulder or stop, 26 and 28 respectively.

Mounted on the post 10, for slidable and rotatable movement thereon, is a tubular spring housing 30 having an integral lower end or bottom plate 32, provided with a central opening, through which the post extends. The upper end of the housing 30 is closed by a removable plug or bushing 34, guidingly embracing the member 22 and detachably fastened to the housing 30 by any suitable means, such as the set screws 36. A transverse slot 38 (Figure 8) of appreciable height extends through the post 10 within the housing, and mounted for vertical movement in the slot 38 is a key or abutment member 40. The key 40 is of substantially the same length as the inner diameter of the housing 30 but of a height less than that of the slot 38.

Disposed within the housing 30 and encircling the post 10 is a coil compression spring 42, having the lower end thereof engaging the upper side of the key 40, preferably with a flat bearing washer 44 interposed therebetween. The other or upper end of the spring 42 engages a flat washer 46 snugly embracing the post 10.

Hence, it will be seen that the housing 30 is resiliently supported on the spring 42, i. e. by the engagement of the bushing or plug 34 with the washer 46. It will be noted, however, that upward movement of the washer 46 is limited by the engagement thereof with the lower end 25 of the member 22. Preferably, when relaxed, i. e. uncompressed, and disregarding the thickness of the washers 44 and 46, the axial dimension of the spring 42 is about equal to the distance between the lower end or abutment of the member 22 and the top of the key 40 when the latter is in its lowermost position in the slot 38, as shown in Figure 4.

Encircling the post 10 within the housing 30 and below the key 40 is another compression coil spring 48, having its lower end engaged against the housing bottom plate 32. Preferably, a flat washer 50 is interposed between the upper end of the spring 48 and the key 40. This spring 48 is of shorter axial length and somewhat weaker than the spring 42 and, when relaxed and again disregarding washer thickness, is of a length about equal to the interior height of the housing 30, minus the length of the spring 42 and the height of the key. In other words, assuming the housing 30 is substantially weightless, as shown in Figure 4, both springs 42 and 48 are normally uncompressed.

Threadedly engaged within the central opening in the housing bottom plate 32 and depending therefrom is a sleeve 52 snugly and slidably mounted on the post 10 and terminating a short distance above the upwardly facing shoulder 28 thereon. One or more vertically spaced circular shelves 54 (two are shown in the drawings) are coaxially secured to the sleeve 52 by means of screws 56 passing through a washer 58 and threadedly engaging a collar 60 fixed to the sleeve by set screws 62. These shelves 54 preferably are formed of sheet metal of sufficient stiffness to support the weight of several watt-hour meters 64 (Figures 1, 2, and 3), yet of sufficient flexibility to provide some shock absorbing qualities. The upper sides of the shelves 54 are padded with a layer of foam rubber 66, or other suitable material, both to prevent scratching or marring of the round glass covers, conventional in meters of this type and, additionally, to cushion the latter.

Spaced above each shelf 54, a distance slightly more than about half the axial length of the round meters 64, is a circular plate 68 that is also coaxially secured to the sleeve 52 by screws 70 passing through a washer 72 and threaded into a collar 74, fixed to the sleeve by set screws 76. Each plate 68 is provided with a circumferential series of meter receiving apertures or holes 78, which are larger in diameter than the meters 64. The edges of the plate holes 78 are padded by a plurality of grommet-like rubber elements 80 suitably secured to the plate 68, as by being clampingly engaged in apertures 82 adjacent to the hole edges.

Pivotally mounted on the upper side of each plate 68 adjacent to the post side of each hole 78 is a curved spring wire arm 84 which extends over its corresponding hole and terminates in a ring-like finger grip 86 adapted to centrally engage a meter 64 received within the hole.

In operation of the carrier, the door 16 is opened and meters 64 placed one by one in each of the plate holes 78 to rest on the shelf 54 therebelow. The spring arms 84 are, of course, lifted manually and individually during this operation to permit the insertion of a meter 64, and then released to permit the arm to bear against the top of the meter. Unloading of meters will proceed in an obvious manner.

In this connection, it will be noted that since the spring housing 30 is free to rotate on the post 10 and on the member 22, the shelves 54 and plate 68 may be rotated to bring the meter-receiving compartments, formed by the plate openings 78, successively into meter loading and unloading position adjacent to the door 16.

The carrier may then be placed in a truck and the meters transported for extended distances and periods of time with no damage or impairment of accuracy thereto. During all normal driving conditions, the meters are resiliently supported by the upper spring 42, with the entire supporting unit or assembly, consisting of shelves 54, plates 68, sleeve 52, housing 30 and bushing 34, floating freely on the upper end of this spring, as shown in Figure 5. Undue free oscillation of the spring 42 is prevented by friction damping between the sleeve 52 and the post 10, and while successive road shocks cause forced oscillation of the spring 42, such shocks usually are of low magnitude and of unrhythmic occurrence. Hence, there is no danger of a resonant condition obtaining. Additionally, the meters are protected against horizontal shocks, usually of a very low order in a motor vehicle, by the grommet-like rubber elements 80.

In the event of an extremely severe road shock, the upper spring 42 is compressed sufficiently to cause the lower end of the sleeve 52 to strike the upwardly-facing shoulder 28 on the post 10, as shown in Figure 6. The meters are protected against this shock both by the cushioning effect of the foam rubber layers 66 and the flexibility of the shelves 54. The entire supporting assembly then rebounds, because of stored energy in its elastic structure and stored energy in the compressed spring 42. However, at the moment the spring 42 is relieved of compression, the top of the lower spring 48 engages the bottom of the key 40. Then, as the assembly continues to rise, with the lower spring 48 retarding such movement, the lower spring is compressed until it lifts the key 40 to thereby compress the upper spring 42 against the washer 46, which is held from rising by the lower end of the tubular member 22. Such compression of the upper spring further retards upward movement of the assembly. Continued upward movement of the assembly is stopped by engagement of the bushing 34 with the downwardly-facing shoulder 26 on the member 22, as shown in Figure 7, just prior to full possible compressions of both springs. The meters are protected against this shock and prevented from bouncing off the shelves 54 by the spring arms 84.

The assembly then reverses its direction of movement and starts downward under the influence of both gravity and the stored energy of both springs 42 and 48.

The aforementioned up-and-down movements continue with dampened sequence until the assembly reaches a state of equilibrium, which is characterized by the gentle oscillation present when the assembly floats on the upper spring 42.

As before stated, free oscillation of the upper spring is prevented by friction damping. Free oscillation of the lower spring 48 cannot occur because it is under compression only intermittently. When a shock violent enough to cause rebound of the assembly occurs, self-induced, forced oscillation of the upper spring 42 is prevented by the fact that, during rebound, the lower spring 48 absorbs some of the available, assembly-lifting energy of the upper spring 42. Then, after upward movement of the assembly is reversed, the upper spring is uncompressed first, i. e. the lower spring is not relieved of compression until the key reaches the bottom of the slot. As this latter spring opens, it dissipates its stored energy. Thus, the lower spring absorbs energy from the assembly but does not release such energy in a form to accelerate movement of the assembly.

In actual practice, a carrier embodying this invention was loaded with freshly calibrated watt-hour meters and placed in a quarter ton 4 x 4 truck (jeep). The truck was then driven at high speed over an extremely rough and rutted road. Bottoming of the supporting unit or assembly on the shoulder 28, with resulting rebound, occurred numerous times. Subsequent inspection of the meters disclosed no structural damage or accuracy deviation whatsoever. Additionally, the portable case, although not fastened down, exhibited no tendency to rise off the floor of the truck or even slide about thereon.

It will thus be seen that the objects of this invention have been fully and effectively achieved. It will be realized, however, that various changes may be made in the specific embodiment shown and described to disclose the principles of this invention without departing from such principles. Therefore, this invention includes all modifications encompassed by the spirit and scope of the following claims.

I claim:

1. A vibration and shock-proof article carrier comprising: an upright post; a spring housing mounted for vertical reciprocation thereon; a first abutment on said post within said housing and between the top and bottom thereof; means mounting said first abutment for limited vertical slidable movement on said post; a compression spring interposed between said housing top and said first abutment; a second abutment fixed on said post above said first abutment; a washer member slidably mounted on said post and cooperating with said fixed abutment to limit the upward movement of the upper end of said spring; a second compression spring interposed between the bottom of said housing and the first abutment; and article supporting shelf means supported by said housing.

2. A vibration and shock-proof article carrier comprising: an upright post, a spring housing mounted for vertical reciprocation thereon; an abutment mounted for limited vertical movement on said post within said housing; a compression spring interposed between said abutment and the top of said housing; a fixed abutment on said post; a washer member slidably mounted on said post and cooperating with said fixed abutment for limiting upward movement of the upper end of said spring; a second compression spring interposed between the first abutment and the bottom of the housing; means supported by said housing for carrying articles.

3. The structure defined in claim 2, including top and bottom stops on the post for limiting the vertical travel of the housing thereon.

UNITED STATES PATENTS

References Cited in the file of this patent

| Number | Name | Date |
|---|---|---|
| 700,721 | Ames | May 27, 1902 |
| 945,098 | Kearin | Jan. 4, 1910 |
| 1,087,519 | White | Feb. 17, 1914 |
| 1,471,594 | Evans | Oct. 23, 1923 |
| 1,896,463 | Offerman | Feb. 7, 1933 |
| 2,099,807 | Gregory | Nov. 23, 1937 |
| 2,119,332 | Kern | May 31, 1938 |
| 2,463,186 | Larson | Mar. 1, 1949 |
| 2,549,906 | Johansson | Apr. 24, 1951 |